United States Patent

[11] 3,633,001

[72] Inventor Barnabas Vajnovszky
Morris Plains, N.J.
[21] Appl. No. 874,183
[22] Filed Nov. 5, 1969
[45] Patented Jan. 4, 1972
[73] Assignee Bel-Art Products
Pequannock, N.J.

[54] APPARATUS FOR MEASURING THE ACTIVITY OF LABORATORY ANIMALS
5 Claims, 4 Drawing Figs.

[52] U.S. Cl. .................................................. 235/92 MT, 235/92 R, 235/92 MS, 340/279
[51] Int. Cl. .................................................. G06m 1/27
[50] Field of Search .................................. 235/92 FQ; 340/278, 279; 43/98, 99

[56] References Cited
UNITED STATES PATENTS
3,439,358 4/1969 Salmons .................. 340/258
3,346,866 10/1967 Bechtel .................... 346/1

FOREIGN PATENTS
610,704 6/1926 France .................... 43/98

Primary Examiner—Maynard R. Wilbur
Assistant Examiner—Robert F. Gnuse
Attorney—Cifelli, Behr and Rhodes ABSTRACT: Apparatus is provided for measuring the effect of psychostimulants upon the activity of laboratory animals. The movement of an animal within a cage is measured by applying a voltage gradient to insulated segments of the cage floor. The animal, in moving across the floor, intermittently contacts adjacent floor segments of different polarity which results in the flow of an interrupted low-amperage current through the animal's body. The current is amplified and the pulses are counted; the number of pulses per unit of time being a measure of the activity of the animal and the effectiveness of the drug dosage administered.

PATENTED JAN 4 1972 3,633,001

INVENTOR.
BARNABAS VAJNOVSZKY
BY
Richards and Cifelli
ATTORNEYS

APPARATUS FOR MEASURING THE ACTIVITY OF LABORATORY ANIMALS

In determining the pharmacology of chemical compounds, it is often desirable to obtain in vivo data as to the motility of animals, most often of very agile rodents such as mice and rats which are best suited for use in such situations.

In motility experiments, one may measure the total motility of the animal and correlate this value with the effectiveness of the compound. Alternatively, a "pattern of movement" may be selected and the frequency with which it occurs recorded.

Prior to about 1961, reliable data on the "pattern of movement" of laboratory animals was obtained by the photocell method of C. A. Winter and L. J. Flataker as described in *J. Pharm. Exp. Theraphy* Vol. 103 p. 93 (1951). This method was later modified by P. B. Dews, *Br. J. Pharm.* Vol. 8 p. 96 (1953).

The advantage of apparatus that will measure the frequency of a "pattern of movement" is that drugs which produce uncoordination, convulsions or fibrilation may be distinguished from compounds that give a significant rise in motility while exhibiting an increase of coordinated motor activities (running, walking, searching, orientation, etc.).

The photocell apparatus has the disadvantage, that measurement is unreliable, when the animal stops in front of the photocell, blocking the way of light. Therefore the animals must be kept under surveillance throughout the experiment. Moreover, in studies concerned with coordinated motor activities involving large areas, such as "hunger motility," object finding, etc., the photocell arrangement is absolutely uneconomical and much too complicated.

Other apparatus that may be used to measure the "pattern of movement" of animal activity has been described by Knoll and Vajnovszky in *Arch. in de Pharmacod. et de Theraphy*, Vol. 130 p. 141–154 (1961). In accordance with this publication, the animal moves within a plastic enclosure over aluminum plates that are mounted on the base of the enclosure and separated by about 3 mm. The animal in moving over the aluminum plates triggers an associated circuit. This apparatus, although offering certain advantages over the photocell apparatus referred to above, had the following disadvantages:

1. The high-voltage gradient between the plates resulted in a current flow through the animal's body that sometimes exceeded 8 microamperes, particularly in those situations where a four-footed animal was in contact with more than two adjacent plates (resulting in multiple channels). A current in excess of 8 microamperes does have a biological effect on the animal and will modify its behavior. In accordance with the present invention, the current flow through the animal will never exceed 3 microamperes.

2. The animal was moving in a transparent enclosure. Since in all drug studies it is of basic importance, that the animal is not distracted on influenced by visual effects from the outside, the applied transparent enclosure did not maintain constant criteria for the test.

3. The metal plates that formed the floor of the apparatus were corroded by the animal urine and feces which frequently short circuited adjacent plates and resulted in a false reading.

4. Because the start and stop switch interrupted the AC line, the time required for the amplifier vacuum tube to reach emission temperature made it impossible to measure the exact time interval of the test.

The present invention avoids the disadvantages discussed above by isolating the laboratory animal in an environment that precludes distraction by external stimulae. Thus the cage for the animal may be constructed of a translucent plastic material, an opaque material or a material that will not transmit any light. In the latter instance, a light may be provided within the cage, or container, if the animal's vision would be one parameter of the experiment.

Another advantage of the present invention is that a lower potential is applied to adjacent plates that form the floor of the enclosure. This results in lower grid currents so that the current flow through the animal's body does not exceed 2-3 microamperes.

Yet another advantage of the present invention is the use of stainless steel plates in the construction of the floor of the enclosure. It has been determined that a stainless steel surface is characterized by a constant surface resistance unlike aluminum and other substances the surface resistance of which is substantially modified by corrosion.

Still another advantage of the apparatus described herein is that the metal plates are raised above the base of the enclosure and supported upon insulators. This construction permits animal excretion to pass through the slots between the plates whereby shorting of the plates is avoided.

Errors caused by the time required for the amplifier tube to warm up to emission temperature are eliminated by employing a relay to open and close the plate circuit of the tube. In this manner the test may be instantly started and stopped by the operator to give a controlled readout of the elapsed test time.

The above advantages are obtained, in accordance with the present invention, by the construction that will be described in connection with the accompanying drawings which illustrate, by way of example, a preferred embodiment of the inventive idea. In the drawings.

Figure 1:
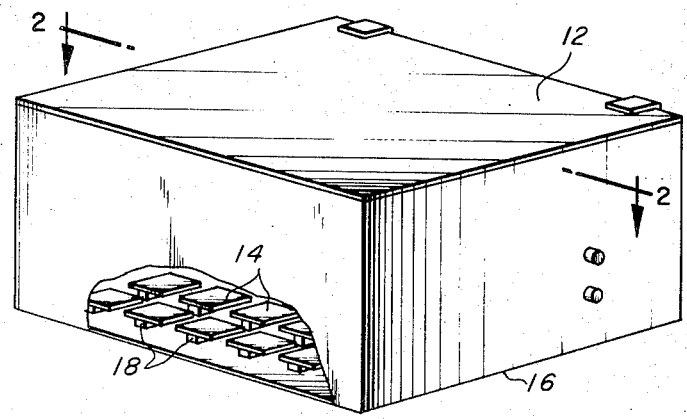
FIG. 1 is a perspective view, partly in section, of an animal enclosure.
Figure 3:
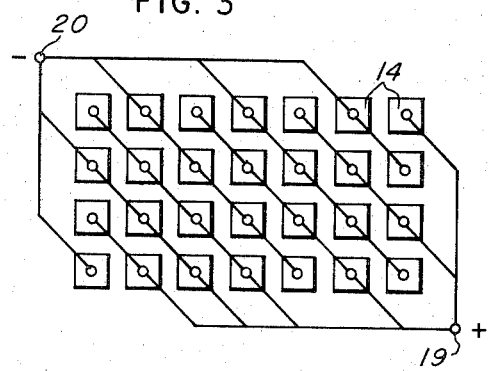
FIG. 3 is a diagram showing one method of connecting the conductive plates to the amplifier input.
Figure 2:
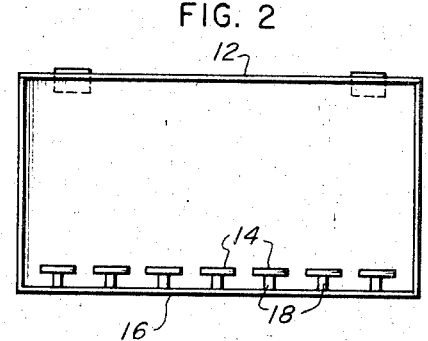
FIG. 2 is a sectional view of the enclosure on the line 2—2 of FIG. 1.

Referring now to FIG. 1, the apparatus of the present invention comprises a cage or enclosure 10 for the animal to be tested, the size of which is related to the size of the test animal. If desired, a very large enclosure may be used to test a number of animals simultaneously. The enclosure may be rectangular in shape and is constructed with a hinged top, 12. A plurality of stainless steel plates 14 are supported in a common plane above the subfloor 16 of the enclosure upon insulators 18. Adjacent plates are separated from each other by a distance that is exaggerated in the drawings for purposes of clarity. The space between plates is about one-eighth inch and each plate is about 4 in. square when mice are used as the test animals. Nonadjacent plates are connected in parallel to the terminals 19 and 20 as best illustrated in FIG. 3. These terminals are used to connect the conductive plates to the input of the amplifier and may be conveniently located toward the back of the enclosure as indicated in FIG. 1.

Figure 4:
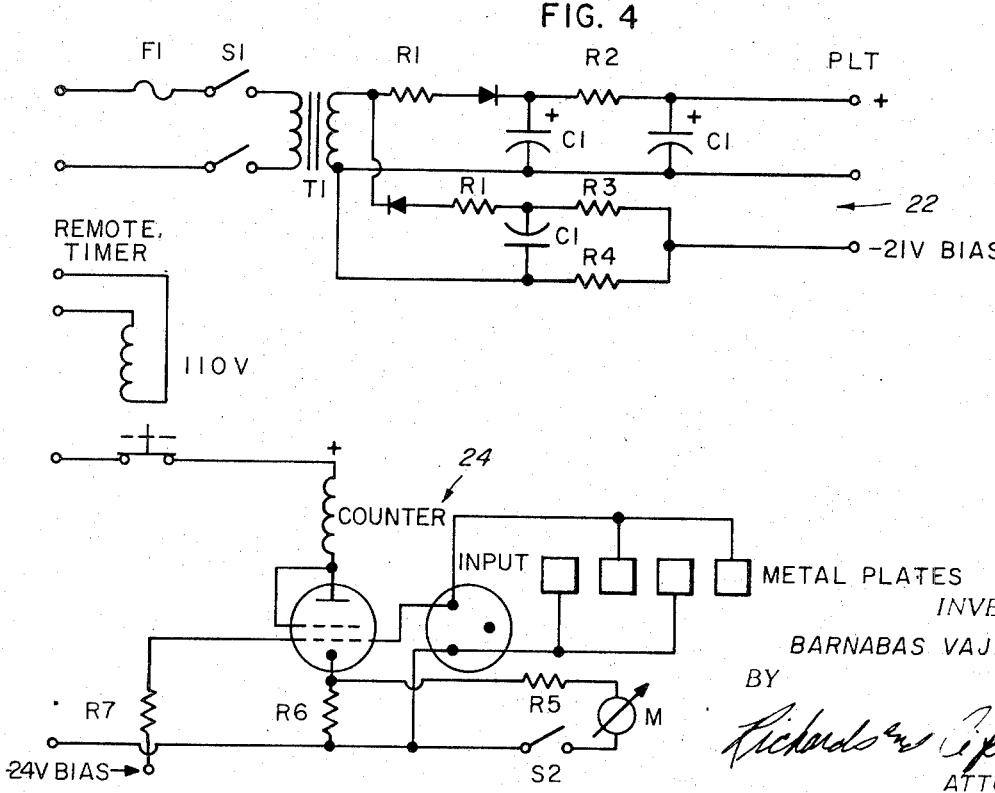
FIG. 4 is a circuit diagram of the amplifying and counting means.

The amplifier-counter section of the apparatus is shown in FIG. 4 and comprises a power supply 22 and a vacuum tube amplifier 24. Suitable values for the circuit components are:

$C_1$—8 microfarads, 450 volts
$F_1$—0.5 ampere fuse, 220 volts.
M—5-milliampere meter
$R_1$—6.8 ohms, 1 watt
$R_2$—1,000 ohms, 6 watts
$R_3$—68,000 ohms, 1 watt
$R_4$—10,000 ohms, 1 watt
$R_5$—16,800 ohms, 1 watt
$R_6$—220 ohms ±10 percent, one-half watt
$R_7$—5 megohms ±10 percent, one-fourth watt
$S_1$—double-pole double-throw switch
$S_2$—single-pole double-throw switch
$T_1$—isolation transformer
$V_1$—6AQ5

The power supply shown is a full wave rectifier capable of supplying direct current at line voltage underload. It also supplies a negative bias of 24 volts to the control grid of the beam tetrode, which blocks the tube. The screen grid of the tetrode is short circuited with the plate.

Under experimental conditions, the movement of the animal over the conductive plates completes the grid-cathode circuit and discharges the negative charge on the control grid. The tube then conducts and the plate current will actuate the counter. The counter should be capable of operating at a speed of 15 counts per second (A suitable counter is manufactured by Veeder Root, Series 1700). For greater convenience a printing counter may be employed (such as the HECON digital printer).

The time of the test may be accurately controlled by using the normally opened contacts of a relay (such as a Potter and Brumfield type K.H.P. Series) to separate the plate voltage from the tube. The relay is shown in its normally opened position by the dotted lines in FIG. 4. When the relay is energized the plate circuit is closed, as shown by the solid line in FIG. 4, and each current pulse resulting from animal movement is counted until the plate circuit is again opened by the relay at any desired predetermined time. My preferred apparatus therefore incorporates a relay that controls the exact time that the plate voltage is applied to the anode and a printing counter to provide an automatic readout of the count (pulses) per unit of time.

In actual use, $S_1$ is closed to activate the power supply and supply filament voltage to the tube. The timer relay is switched on to apply a positive voltage to the plate of the tube and the switch $S_2$ is closed to determine the condition of the conductive plates 14. If any of these plates are shorted by dirt or any foreign object bridging the space between plates the needle of the meter, M will be deflected. If the meter check is satisfactory, the timer relay is switched to the open position, the desired number of animals is placed within the cage 10 and the experiment is started by switching the timer relay to the closed position (shown in solid line). In general, readings may be made over 10- to 15-minute intervals for several hours.

What is claimed is:

1. Apparatus for providing a count representative of the physical activity of an animal, such apparatus being operable independent of the animal's weight and operable independent of the size of the test area, comprising:
    an enclosure constructed to confine said animal within a predetermined area;
    a floor within said enclosure;
    a plurality of electrically conductive individual plates arranged in transverse rows;
    means for applying differing potentials to said plates such that adjacent plates in said transverse rows are at different potentials;
    insulator means for supporting said plates in a substantially common plane a predetermined distance above said floor;
    said plates being separated by a distance slightly larger than the foot of said laboratory animal, and said plates being made of a corrosive resistant material;
    amplifier means;
    indicating means connected to said amplifier means and for providing an indication upon the operation of said amplifier means;
    conductive means for connecting said plurality of plates to said amplifier means; and
    upon the body of said laboratory animal interconnecting at least two plates at differing potentials a signal is applied to said amplifier by said conductive means to cause said amplifier to operate and in turn cause said counter to record a count.

2. Apparatus for providing a count which is indicative of the physical activity of a laboratory animal, such apparatus being operable independent of the animal's weight and operable independent of the size of the test area, comprising:
    an enclosure constructed to confine said animal within a predetermined area;
    a floor within said enclosure;
    a plurality of electrically conductive individual plates arranged in transverse horizontal and vertical rows;
    insulator means for supporting said plates in a substantially common plane a predetermined distance above said floor;
    said plates being separated by a distance slightly larger than the foot of said laboratory animal, and said plates being made of a corrosive resistant material;
    an amplifier including an input and an output;
    a counter connected to said amplifier output;
    conductor means for connecting nonadjacent plates of said plurality in parallel and to said input of said amplifier; and
    means for establishing a voltage gradient between adjacent plates of said plurality such that upon the body of said animal interconnecting at least two adjacent plates a current will flow through said animal and said current will be applied to said amplifier input by said conductor means to cause said amplifier to operate said counter and provide said count.

3. Apparatus according to claim 2 further including a timer for selectively enabling and disabling said amplifier.

4. Apparatus according to claim 2, wherein said plates are square and not smaller than approximately 4 inches in length and width.

5. Apparatus according to claim 2, wherein said amplifier comprises a vacuum tube normally biased in the off condition, said nonadjacent plates of said plurality being connected in parallel to the control grid of said tube, and said counter is connected to the plate of said tube, and upon the body of said animal interconnecting at least two adjacent plates and said current flowing through said animal said amplifier being biased into the on condition and said counter caused to operate.

* * * * *